Figure 1:
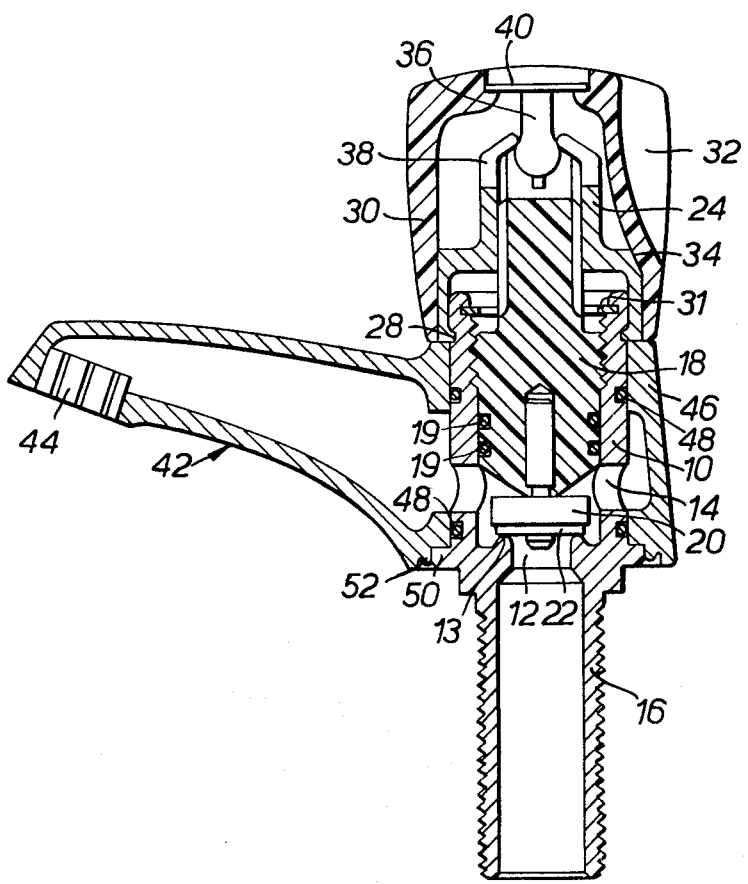

United States Patent [19]

King

[11] 3,942,760
[45] Mar. 9, 1976

[54] VALVES

[75] Inventor: Victor Howard George King, Ilford, England

[73] Assignee: Barking Brassware Co., Ltd., Barking, England

[22] Filed: June 19, 1974

[21] Appl. No.: 480,712

[52] U.S. Cl. ............................... 251/267; 251/270
[51] Int. Cl.² .................. F16K 31/50; F16K 31/60
[58] Field of Search ........... 251/266, 267, 270, 271, 251/272

[56] References Cited
UNITED STATES PATENTS 3,503,586   3/1970   Bordes .............................. 251/266

FOREIGN PATENTS OR APPLICATIONS 449,119   6/1936   United Kingdom ................. 251/266

*Primary Examiner*—Alan Cohan
*Attorney, Agent, or Firm*—Brisebois & Kruger

[57] ABSTRACT

This invention relates to a water tap in which a screw threaded valve member is operated by a handle. Between the handle and valve member there is an intermediate member which is snapped into the valve housing and transmits rotary motion from the handle to the valve member. The handle is removably connected to the intermediate member and is arranged to overlie the intermediate member so as to conceal it and retain it in snap fit engagement with the valve body.

13 Claims, 3 Drawing Figures

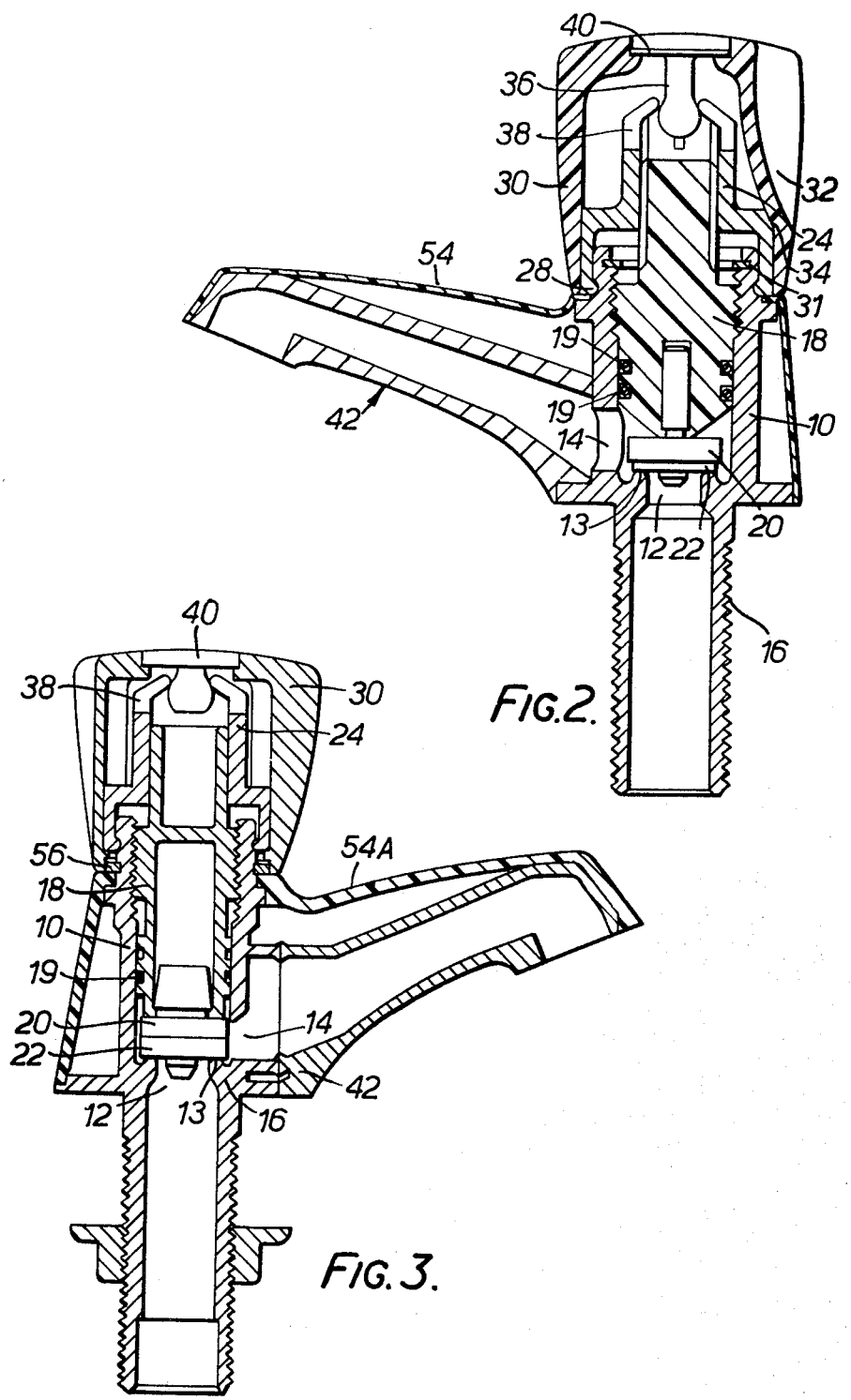

VALVES

This invention relates to valves and has especial but not exclusive reference to domestic water taps.

The invention is especially concerned with the provision of valves which are of simple construction and are easily assembled and which may advantageously be made from inexpensive and readily worked materials.

According to the invention a valve includes
a body having a valve seat,
a valve member in screw thread engagement with the body,
a control member for rotating the valve member,
and an intermediate member adapted to locate the control member axially on the body and to transmit rotational movement from the control member to the valve member.

To facilitate assembly the intermediate member preferably is adapted to enter into snap-on engagement with the body. There may be a circumferentially extending channel on the body or in the intermediate member, the channel being engaged by lugs or, preferably by a circumferentially extending bead. To provide resilience for assembly and stripping, the intermediate member preferably is provided with one or more generally axial slits or apertures which enable the intermediate member to expand radially in a resilient manner. The control member may then be arranged to contact at least that region of the intermediate member in which the slits or apertures are formed, in order to lock the intermediate member in engagement with the body.

In a preferred arrangement the intermediate member has axial slits which extend upwardly from the lower end of the member.

The control member is a generally cup-shaped knob and fits over the intermediate member such that the rim of the cup contacts and surrounds the lower end of the intermediate member. The exterior of the knob is contoured in a manner which assists operation and which is also decorative.

Preferably the control member is positively retainable on the intermediate member. For example the control member may be a snap-on fit on the intermediate member, or a stud may be employed which can seat against the control member and enter into a snap-on engagement with the interemdiate member. In a preferred arrangement the stud has a disc at one end for seating against control member and a spherical or frusto-conical portion at the other end for entering into snap-on engagement with the intermediate member. Preferably the disc conceals the remainder of the stud after assembly. The disc may bear a decorative device or may itself be concealed by a decorative insert. The disc or the insert may carry information as to the nature of or, for example, the temperature of the fluid to be controlled by the valve.

Travel of the valve member preferably is limited by contact between co-operable transverse surfaces on the valve member and the intermediate member, but as an alternative may be limited by stop means on the body.

The valve may also include a discharge spout. In one preferred arrangement the spout is a metal casting or a plastics moulding having a discharge nozzle at one end and a housing at the other end for the body. Conveniently the body is a push fit in the housing and the body and/or the housing have recesses for O-rings or other seals. Preferably all joins between the body and the housing are disposed downstream of the valve member so as to be pressurised only when the valve is open. Preferably also the housing and body are positively secured together at only one axial location so that relative axial expansion and contraction may be accommodated: this is especially advantageous where the housing and body are of different materials; for example the housing and indeed the entire spout may be of stainless steel or chromium-plated brass whereas the body may be of a plastics material such as an acetal co-polymer.

Where, for example, both the body and the spout are of plastics they may be ultrasonically welded together or joined by a hot-plate weld. For the sake of appearance and to afford some protection the spout and the body may be covered by a shroud, for example of metal-coated plastics, or stainless steel or chromium-plated brass. It will be appreciated that with this arrangement the join between the spout and the body is inevitably downstream of the valve member.

Preferably a sealing washer on the valve member is rotatable relative to the valve member so as to reduce scuffing on the valve seat.

By way of example only, three valves embodying the invention will now be described with reference to the accompanying drawings of which:

FIG. 1 is a sectional elevation of a first valve,
FIG. 2 is a sectional elevation of a second valve, and
FIG. 3 is a sectional elevation of a third valve.

Like parts bear identical reference numberals throughout the drawings and description.

Referring to FIG. 1, an acetal co-polymer valve body has an axial inlet 12 and a pair of diametrically-opposed radical outlets 14. The lower part of the body 10 forms an externally threaded adpater 16, and near the top of the body there is an internal helical thread in which a valve member 18 may be run up and down. O-rings 19 prevent leakage between the valve member 18 and the body 10. At its lower end the valve member 18 retains a washer plate and stem 20 on which an annular rubber washer 22 is mounted. The washer 22 and the washer plate and stem 20 can rotate relative to the valve member; this is to reduce scuffing between the washer and seating 13 of the inlet 12. The valve member 18 and the washer plate and stem 20 are also of acetal co-polymer.

The upper end of the valve member 18 is splined and engages a similarly splined intermediate member 24 within a control knob 30. In a modification (not shown) the splines are replaced by a hexagonal drive. The intermediate member 24 is of acetal co-polymer and has at its lower end a radially-inwardly projecting circumferential bead 28 which is a snap-on fit with a corresponding circumferential groove in the body 10. To provide resilience for the snap-on fit twelve axial slits (not shown) extend upwardly from the lower end of the intermediate member 24 for about a quarter of the overall length of the part. To lock the bead 28 into the groove the control knob 30, which is a generally cup-shaped plastics moulding, has a rim which is a push fit on the lower end of the intermediate member 24. When the knob 30 is positioned as shown in the drawing it locks the intermediate member 24 in engagement with the body 10, and although the knob may rotate freely relative to the body, relative axial movement is prevented. Thus rotation of the knob 30 drives the valve member 18 up and down to open and close the inlet 12. A circlip 31 in a groove in the body limits upward movement of the valve member 18. This arrangement represents an improvement upon valves in which a separate head-part is screwed into the valve body, because either compaction of a sealing washer or thermal cycling can loosen a screwed assembly and eventually permit the head-part to become unscrewed from the body if the valve is over-enthusiastically opened.

Relative rotation of the intermediate member 24 and knob 30 is prevented because the latter has axial finger recesses 32, the inner surfaces of which engage recesses 34 in the intermediate member 24. The knob 30 is retained on the intermediate member 24 by a plastics stud 36 which is a snap-on fit with four fingers 38 formed at the upper end of the intermediate member 24. The upper end of the stud terminates in a disc 40 which seats in a counterbore in the top of the knob 30. A decorative insert (not shown) conceals the disc 40. It will be appreciated that the components described so far may be assembled easily and without the use of tools. Similarly the valve is easily dismantled for replacement of the washer 22 should this be necessary.

The valve is completed by a chromium-plated brass spout 42 which has a nozzle 44 at one end and which at the other end forms a housing 46 for the valve body 10. The body 10 is a push fit in the housing 46 and is sealed thereto above and below the outlets 14 by O-rings 48. A shoulder 50 on the body 10 locates in a counterbore in the base of the housing 46, and axial restraint is provided by an in-turned lip 52 on the housing. It will be seen that relative thermal movement between the housing 46 and the body 10 is readily accommodated. And it will also be seen that both of the joins between the housing 46 and the body, being downstream of the washer 22, are only pressurised when the valve is open.

Referring now to FIG. 2, it will be seen that only the body 10 and the spout 42 are different from the valve shown in FIG. 1. Accordingly, only these differences will be described.

The body 10 of the valve shown in FIG. 2 has a single radial outlet 14 which co-operates with an acetal co-polymer spout 42 which has been ultrasonically welded to the body. Here again the join between spout and body is only pressurised when the valve is open. For better appearance, and to protect the spout 42 and the body 10, a shroud 54 extends over the spout and that part of the body 10 not concealed by the central knob 26. The shroud 54 is held in place by the knob 26. The shroud is of chromium-plated brass.

The valve shown in FIG. 3 is basically similar to those described above but incorporates a number of improvements which will now be described.

Firstly the circlip 31 shown in FIGS. 1 and 2 is dispensed with and instead upward travel of the valve member 18 is limited by contact between the valve member and the underside of the intermediate member 24. Quite apart from simplifying the valve, it has been found that this arrangement is stronger.

Secondly, the valve employs a shroud in the same manner as the valve of FIG. 2, but this shroud is of plastics and is an ABS moulding plated with chromium. Furthermore the shroud is retained on the body by a circlip 56 rather than relying on the intermediate member 24 for retention as in the valve of FIG. 2.

Thirdly the spout 42 of acetal co-polymer has been joined to the body 10, which is of the same material, by hot-plate welding. For this reason the entire join between the spout and the body has been brought into a single plane so that a hot-plate can readily contact and heat the entire weld surface of each component. The weld is performed in the normal manner, the hot-plate being removed from between the components when their weld surfaces are sufficiently hot, and the components then being brought into direct contact.

And fourthly drive is transmitted from the control knob 30 to the intermediate member 24 by twelve axial ribs (not shown) on the inside of the former which engage the axial resilience slits in the latter.

Referring finally to FIGS. 1, 2 and 3, it will be appreciated that the body 10 and its associated working parts could be utilised in ways other than those illustrated. For example a pair could be incorporated in a mixer arrangement.

I claim:

1. A fluid flow control valve comprising in combination a hollow valve body with a fluid inlet and a fluid outlet, a valve seating in the valve body between the fluid inlet and the fluid outlet, a valve member that co-operates with the valve seating to control fluid flow from the fluid inlet to the fluid outlet, the valve member being mounted in the valve body in screw threaded engagement therewith, an intermediate member, the valve member being engaged with the intermediate member for rotation therewith, the intermediate member being in snap-on engagement with the valve body whereby rotational but not axial movement of the intermediate member relatively to the valve body is permitted, an operating handle for rotating the intermediate member, and for retaining the latter in snap-on engagement with the valve body, leak preventing means located within the valve body for preventing the leakage of fluid between the valve member and the valve body, and a releasable retainer for securing the operating member to the intermediate member.

2. A valve as claimed in claim 1 and further comprising, on the intermediate member, a plurality of resilient fingers, and, on the valve body, a peripheral groove in which the fingers engage and are retained in engagement by the operating member.

3. A valve as claimed in claim 1 in which travel of the valve member is limited by contact between co-operable transverse surfaces on the valve member and the intermediate member.

4. A valve as claimed in claim 1 in which travel of the valve member is limited by stop means on the valve body.

5. A valve as claimed in claim 1 and further comprising a spout for the discharge of fluid from the valve body.

6. A valve as claimed in claim 5 in which the spout has a discharge nozzle at one end and a housing at the other end in which the valve body is mounted.

7. A valve as claimed in claim 5 in which the spout is welded to the valve body.

8. A valve as claimed in claim 5 in which the valve body and the spout are covered by a shroud.

9. A valve as claimed in claim 8 in which the shroud is retained on the valve body by the intermediate member.

10. A fluid flow control valve comprising in combination a hollow valve body with a fluid inlet and a fluid outlet, a valve seating in the valve body between the fluid inlet and the fluid outlet, a valve member mounted in the valve body in screw threaded engagement therewith for co-operation with the valve seating, an intermediate member separate from the valve member, the valve member being engaged with the intermediate member for rotation therewith and longitudinal movement relatively thereto, intermediate member being rotatably mounted upon the valve body but secured against axial movement relatively thereto, a separate operating member for rotating the intermediate member, the operating member being separate from the intermediate member upon which the operating member is mounted and which it conceals, leak preventng means located within the valve body for preventing the leakage of fluid between the valve member and the valve body, and a releasable retainer for securing the operating member to the intermediate member.

11. A valve as claimed in claim 10 in which the valve member has a screw-threaded portion and a plain surfaced portion having a peripheral groove therein, and in which the leak preventing means comprises an 'O' ring located in the peripheral groove.

12. A valve as claimed in claim 10 in which the valve body has a peripheral groove, and in which the intermediate member has a plurality of spaced resilient fingers engaged in the groove and retained therein by the operating member.

13. A valve as claimed in claim 12 in which the interior of the operating member is formed with a pluality of axial ribs which engage the spaced resilient fingers to transfer rotation of the operating member to the intermediate member.

* * * * *